United States Patent [19]
Park

[11] Patent Number: 5,900,774
[45] Date of Patent: May 4, 1999

[54] DIRECT CURRENT DIFFERENTIAL BASE VOLTAGE GENERATING CIRCUIT

[75] Inventor: Hyun-Jin Park, Kyeongki-Do, Rep. of Korea

[73] Assignee: Daewoo Electronics Co., Ltd., Seoul, Rep. of Korea

[21] Appl. No.: 08/821,681

[22] Filed: Mar. 20, 1997

[30] Foreign Application Priority Data

Nov. 28, 1996 [KR] Rep. of Korea ............ 96-59195

[51] Int. Cl.$^6$ ................ G09G 1/28; G05F 3/04
[52] U.S. Cl. ............ 327/540; 327/108; 327/575; 323/316; 348/678
[58] Field of Search ............... 327/538, 540, 327/539, 575, 108; 323/313, 315, 316; 348/678, 679, 682, 686

[56] References Cited

U.S. PATENT DOCUMENTS

| | | |
|---|---|---|
| 4,081,838 | 3/1978 | Wheeler ............... 358/169 |
| 4,658,205 | 4/1987 | Yamada ............... 323/313 |
| 5,140,181 | 8/1992 | Yoshino . |
| 5,339,020 | 8/1994 | Siligoni et al. ........ 323/313 |
| 5,483,151 | 1/1996 | Yamashita ............ 323/315 |
| 5,606,339 | 2/1997 | Tsong et al. .......... 345/22 |
| 5,661,530 | 8/1997 | Honda et al. ......... 348/679 |
| 5,686,823 | 11/1997 | Rapp ................. 323/315 |
| 5,686,825 | 11/1997 | Suh et al. ............ 323/316 |

*Primary Examiner*—Timothy P. Callahan
*Assistant Examiner*—Terry L. Englund
*Attorney, Agent, or Firm*—Pillsbury Madison & Sutro LLP

[57] ABSTRACT

A direct current controlled differential base voltage generating circuit, applicable to a gain control of an RGB video amplifier for controlling a contrast by a voltage generating circuit in which an input control signal has a voltage within a set range, has a high input impedance. Since a differential base voltage is controlled by an input control signal applied thereto through bases of PNP Darlington-connected transistors, the circuits high input impedance can provide operation when a voltage of the input control signal is about 0 volts. Therefore, the direct current controlled differential base voltage generating circuit can easily interface with a computer controlled alignment system.

11 Claims, 3 Drawing Sheets

DIRECT CURRENT DIFFERENTIAL BASE VOLTAGE GENERATING CIRCUIT

BACKGROUND OF THE INVENTION

1. Field of the Invention

The present invention relates to a circuit for generating a direct current (DC) control differential base voltage. More particularly, the present invention relates to a DC controlled differential base voltage generating circuit applicable to a gain control of an RGB video amplifier for controlling a contrast by a voltage generating circuit in which an input control signal has a voltage within a set range so that it can easily interface with a computer controlled alignment system and so that it has a high input impedance.

2. Description of the Prior Art

In general, all kinds of video signal processing devices including a television receiver, has a contrast control section at an output terminal of an RGB video amplifier. In such video amplifier for controlling a contrast, a gain variation thereof causes a contrast of a video signal to change. In order to control a gain of the video amplifier for controlling a contrast, a conventional method controls a voltage fed back from an output to an input by adjusting a variable resistance so that the gain of the video amplifier is changed.

FIG. 1 shows a conventional differential base voltage generating circuit for controlling a gain of a video amplifier in order to control a contrast by using a variable resistor.

Referring to FIG. 1, the conventional differential base voltage generating circuit includes a differential amplifier having transistors Q5, Q6, Q7 and Q8 and resistors R6, R7 and R8, which receives a difference voltage between both bases of the sixth and seventh transistors Q6 and Q7, that is, a differential base voltage $\Delta V$.

A potential divider 5, constituted by a first resistor R1 and a second resistor R2 is arranged between a driving voltage Vcc and a pair of diode-connected transistors Q1 and Q2, where Q2 is grounded, and the connection of the R1 and R2. A pair of diode-connected transistors Q1 and Q2, for maintaining a constant voltage from the ground, is connected in series with the base of a transistor Q6. Therefore, a constant voltage is always generated between first resistor R1 and second resistor R2 of the divider 5 and is applied to a base of the third transistor Q3 so that the third transistor Q3 is turned on. In consequence, a voltage across an emitter resistor R4 of an emitter-follower transistor Q3 is applied to a base of an emitter-follower transistor Q4. Accordingly, transistor Q4 is turned-on.

A voltage across an emitter resistor R5 of transistor Q4 is applied to a base of transistor Q6 of differential amplifier 1. Therefore, first, second, third and fourth transistors Q1, Q2, Q3, and Q4, first resistor R1, second resistor R2, third resistor R3, fourth resistor R4, and fifth resistor R5 constitute a reference voltage generating section 3 and; serve to supply a reference voltage to base of the sixth transistor Q6.

An emitter of a feed back transistor Q8 is connected to a base of the seventh transistor Q7, a base thereof is connected to a collector of the seventh transistor Q7, and a collector thereof is connected to a driving voltage Vcc through a third resistor R3. A seventh resistor R7 is connected between the base of the seventh transistor Q7 and a ground. A variable resistor $R_V$ is connected to a collector of the seventh transistor Q7 through a ninth resistor R9.

A differential base voltage $\Delta V$ of differential amplifier 1 constructed as above is calculated by means of an expression (1) which will be described as follows.

$$\Delta V = V_{BE6} - V_{BE7} = V_T \ln I_6/I_s - V_T \ln I_7/I_s$$

$$= V_T \ln I_6/I_7 \qquad (1)$$

As described in expression (1), the differential base voltage $\Delta V$ is determined by currents $I_6$ and $I_7$ flowing through the sixth and seventh transistors Q6 and Q7, respectively. The current $I_7$ is the sum of a current $I_8$ flowing through an eighth resistor R8 and a current $I_9$ flowing through a ninth resistor R9. Therefore, the conventional differential base voltage generating circuit controls the variable resistor $R_V$ to adjust the value of $I_9$ so that the differential base voltage $\Delta V$ can be generated.

Currently, in high quality video systems, the video control is performed by a computer. However, since the conventional differential base voltage generating circuit controls the variable resistor $R_V$ to adjust the value of $I_9$ so that the differential base voltage $\Delta V$ can be generated, the conventional differential base voltage generating circuit has a low input impedance and cannot easily interface with a computer controlled alignment system.

U.S. Pat. No. 5,140,181(issued to Hiroshi Yoshino on Aug. 18, 1992) discloses one example of a direct current differential base voltage generating circuit. U.S. Pat. No. 5,140,181 relates to a reference voltage source circuit used in a bipolar monolithic integrated circuit such as an audio circuit. According to the reference voltage source circuit, the emitters of the transistors constituting a difference amplifier are biased by a constant current source. A current mirror circuit is connected to the collectors of the transistors constituting the differential amplifier. A reference potential circuit for generating a reference potential is connected to the base of one of the transistors constituting the differential amplifier, and an output current from the current mirror circuit is fed back to the base of the other transistor. Therefore, the reference potential generated from the reference potential circuit is applied to the base of the other transistor. The reference potential applied to the base of the other transistor is applied to the base of a transistor of Darlington-connected transistors which receives an input signal, and the reference potential serves as a bias power source voltage. U.S. Pat. No. 5,140,181 has a high current gain and low distortion, but does not have a high impedance.

U.S. Pat. No. 4,658,205, (issued to Kazuyoshi Yamada on Apr. 14, 1987) discloses another example of a direct current differential base voltage generating circuit. U.S. Pat. No. 4,658,205 relates to a reference voltage generating circuit wherein a temperature characteristic of an output voltage is set as desired. The reference voltage generating circuit is constituted by a source of a constant current, a power supply having high and low voltage terminals, an emitter follower circuit connected across the high and low voltage terminals and the output terminal of the source of constant current and the other ends connected to the input terminal of the emitter follower circuit, a third resistor with one end connected to the high voltage terminal and a diode with its anode electrode connected to the other side of the third resistor and its cathode electrode connected to the output terminal of the source of constant current. U.S. Pat. No. 4,658,205 has a temperature characteristic not influenced by the temperature characteristic of the driving voltage of a constant current source, but does not have a high impedance which can easily interface with a computer controlled alignment system.

SUMMARY OF THE INVENTION

Therefore, an object of the present invention is to provide a DC controlled differential base voltage generating circuit applicable to a gain control of an R G B video amplifier for controlling a contrast by a voltage generating circuit in which a voltage of an input control signal is within a set range so that it can easily interface with a computer controlled alignment system and so that it has a high input impedance.

In order to achieve the object, the present invention provides a circuit for generating a direct current control differential base voltage, the circuit comprising:

an input circuit for receiving an input control signal from an outside and having a high input impedance;

a differential amplifier including first and second transistors;

a first reference voltage generating means for supplying a predetermined reference voltage to a base terminal of the first transistor;

a constant current means for generating a first constant current and for supplying the first constant current to the second transistor; and a current control means connected to an output terminal of the input circuit for generating a current signal for controlling in the first constant current in proportion to a voltage of the input control signal, whereby the circuit outputs a differential base voltage from a base terminal of the first and second transistors of the differential amplifier.

In the present invention, since a differential base voltage is controlled by an input control signal applied thereto through bases of PNP Darlington-connected transistors, the present invention has a high input impedance and can operate when a voltage of the input control signal is about 0 volts. Therefore, the present invention can easily interface with a computer controlled alignment system.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the mechanical structure, the circuitry configuration, and the operation of a DC controlled differential base voltage generating circuit according to one embodiment of the present invention.

Figure 1:
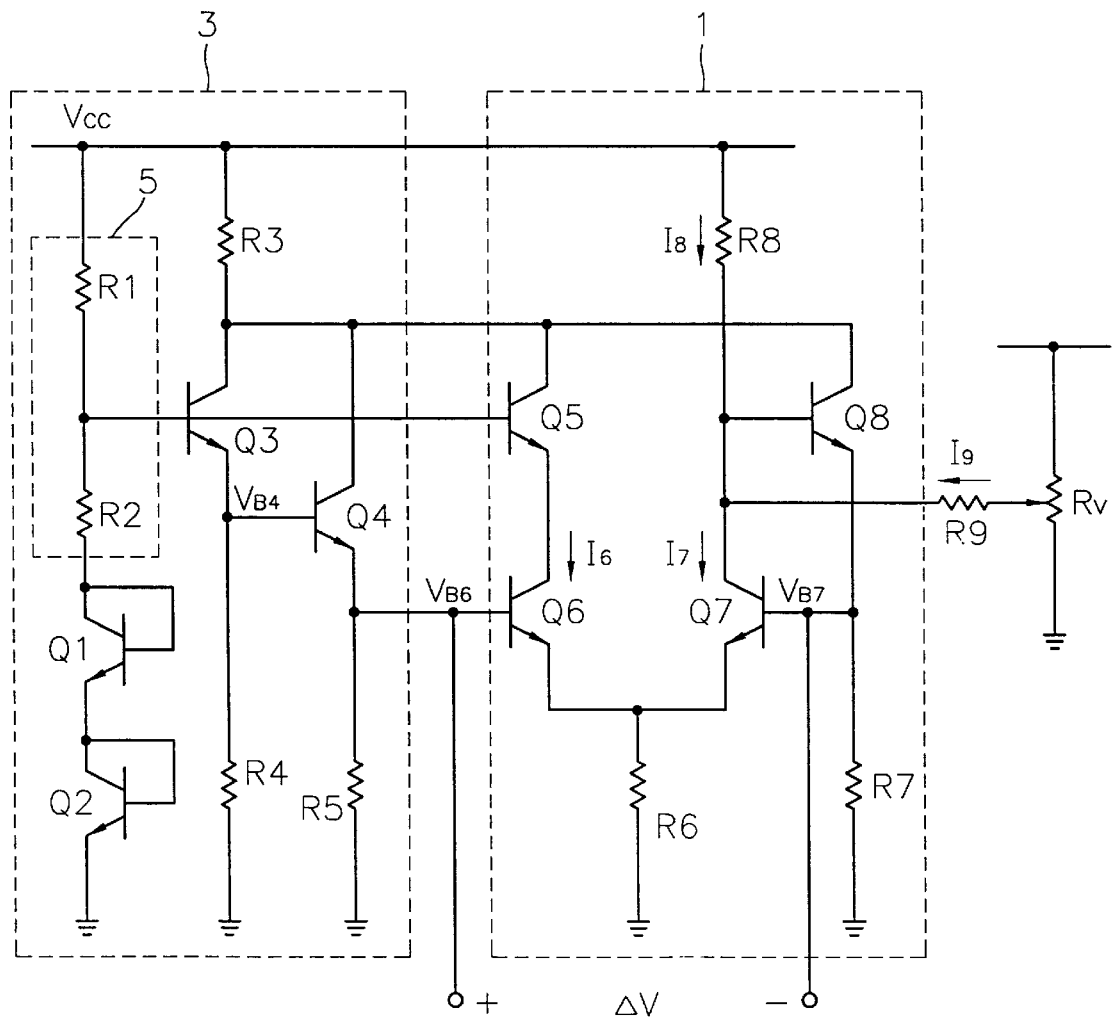
FIG. 1 is a circuit diagram for showing a configuration of a conventional DC controlled differential base voltage generating circuit.
Figure 2:
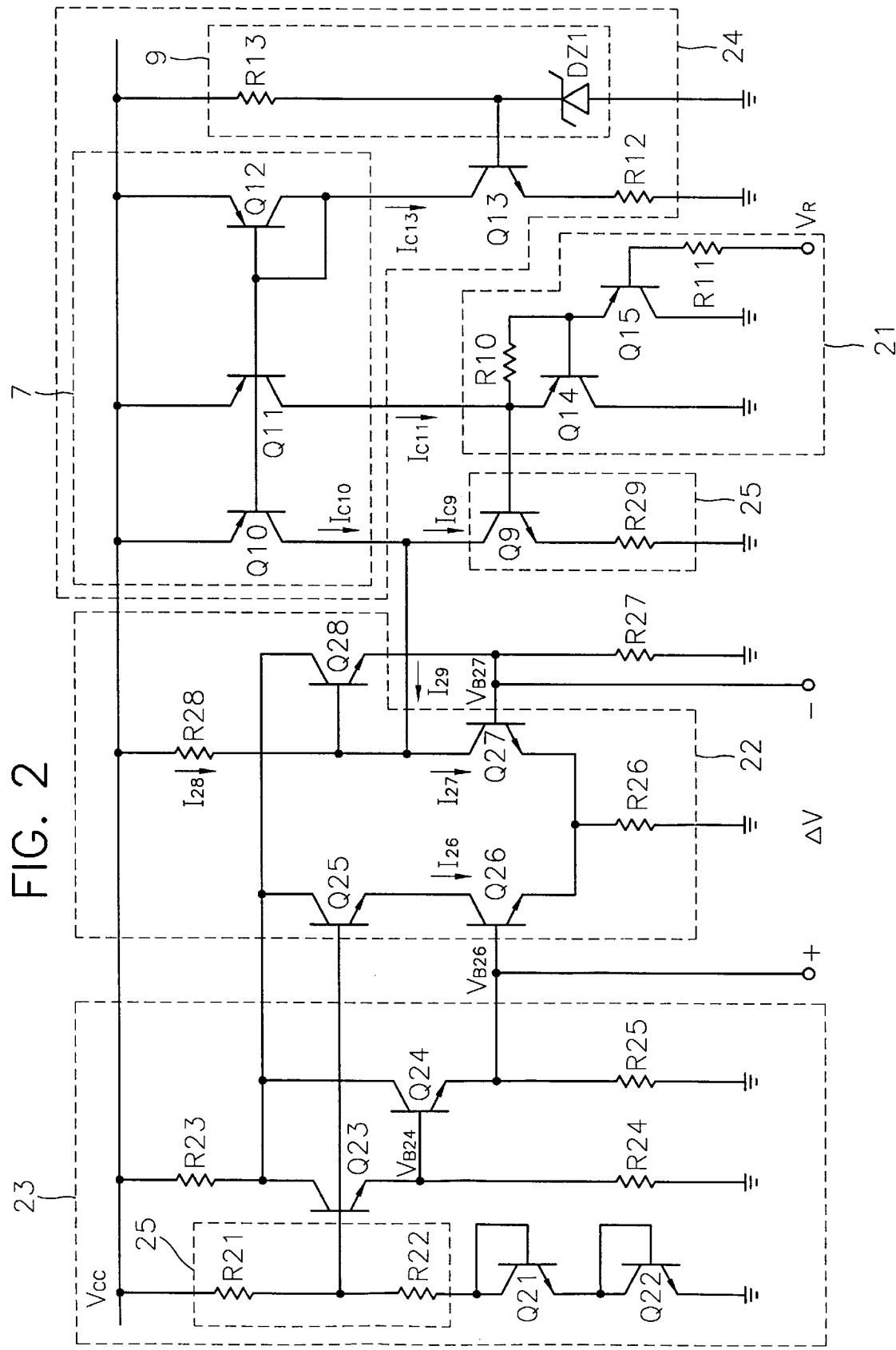
FIG. 2 is a circuit diagram for showing a configuration of a DC controlled differential base voltage generating circuit according to one embodiment of the present invention.
Figure 3:
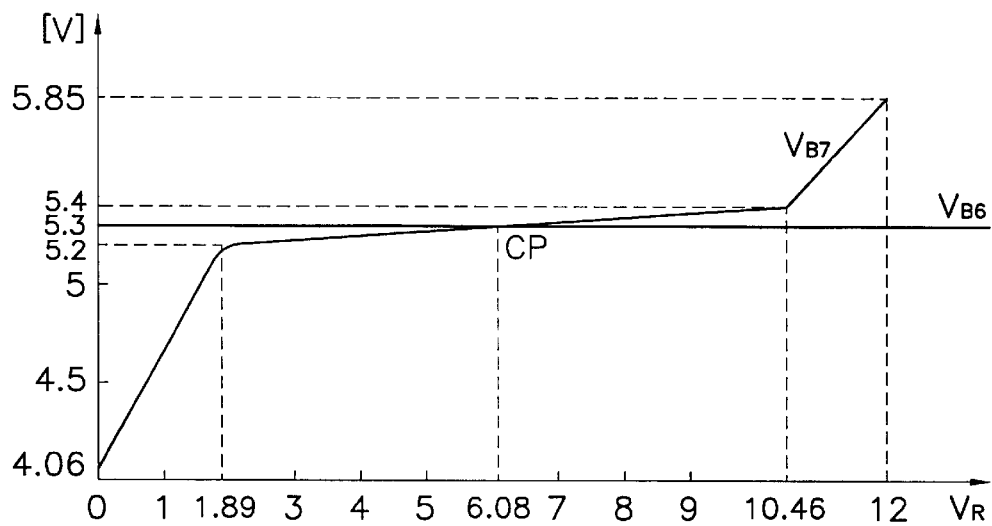
FIG. 3 is a graph for showing a relation of a control input and a base voltage of the conventional DC controlled differential base voltage generating circuit shown in FIG. 1.
Figure 4:
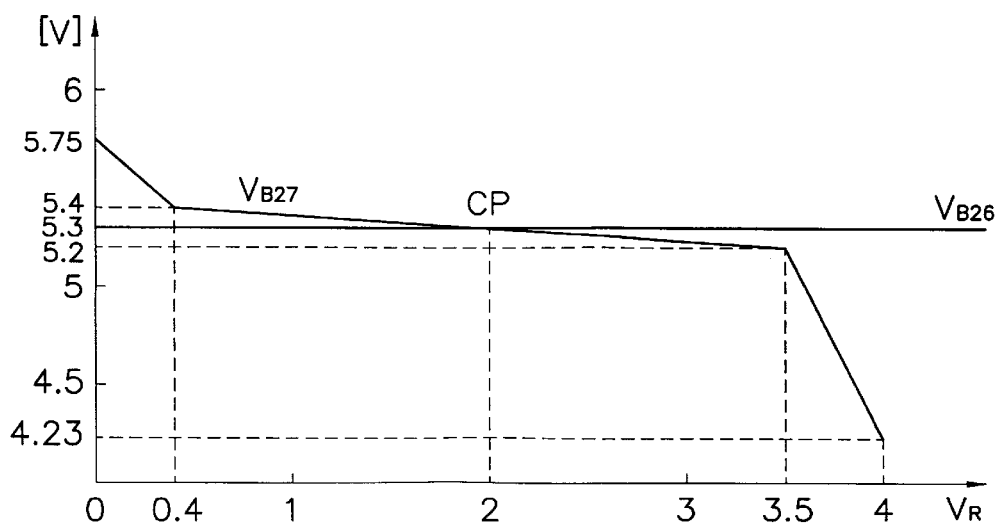
FIG. 4 is a graph for showing a relation of a control input and a base voltage of the DC controlled differential base voltage generating circuit according to the embodiment of the present invention shown in FIG. 2.

FIG. 2 shows a configuration of a DC controlled differential base voltage generating circuit according to one embodiment of the present invention. FIG. 3 shows a relation of a control input and a base voltage of the conventional DC controlled differential base voltage generating circuit shown in FIG. 1. FIG. 4 shows a relation of a control input and a base voltage of the DC controlled differential base voltage generating circuit according to the embodiment of the present invention shown in FIG. 2.

The DC controlled differential base voltage generating circuit according to the present invention includes an input circuit 21, a differential amplifier 22 having first and second transistors Q26 and Q27, a reference voltage generating circuit 23, a constant current circuit 24, and a current control circuit 25. Input circuit 21 receives an input control signal $V_R$ and has a high input impedance. Differential amplifier 22 includes transistors Q25, Q26, Q27 and Q28, and a resistor R28. First reference voltage generating circuit 23 supplies a predetermined reference voltage $V_{B26}$ to a base terminal of first transistor Q26. Constant current circuit 24 generates first, second, and third constant currents $I_{c10}$, $I_{c11}$ and $I_{c13}$ and supplies the first, second, and third generated constant currents $I_{c10}$, $I_{c11}$ and $I_{c13}$ to transistors Q9, Q14, and Q13, respectively. Current control circuit 25 is connected to an output terminal of input circuit 2 for a current signal in proportion to a voltage of the input control signal $V_R$ and controls the first constant current $I_{c10}$ generated by constant current circuit 24 and flowing in second transistor Q27.

As shown in FIG. 2, the DC controlled differential base voltage generating circuit according to the present invention gets a differential base voltage $\Delta V$ between a base of first transistor Q26 and a base of second transistor Q27.

The reference voltage generating circuit 23 includes a potential divider 25, which is constituted by a first resistor R21 and a second resistor R22, a pair of diode connected transistors Q21 and Q22 for maintaining a constant voltage from a ground, resistors R23, R24 and R25 and transistors Q23, Q24. The connection of the resistors R21 and R22 is connected to a base of the transistor Q26 of the differential amplifier 22 through the transistors Q23 and Q24, for applying a reference voltage. Therefore, a constant voltage is always generated between first resistor R21 and second resistor R22 of the potential divider 25 and is applied to a base of transistor Q23 so that transistor Q23 is turned-on. In consequence, a voltage across the emitter resistor R24 of the emitter-follower transistor Q23 is applied to a base of an emitter-follower transistor Q24. Accordingly, transistor Q24 is turned-on.

A voltage across an emitter resistor R25 of transistor Q24 is applied to a base of transistor Q26 of differential amplifier 22. Therefore, transistors Q21, Q22, Q23, and Q24, first resistor R21, and second resistor R22 serve to supply a reference voltage to the base of transistor Q26.

An emitter of a feed back transistor Q28 is connected to a base of transistor Q27, a base thereof is connected to a collector of transistor Q27, and a collector thereof is connected to a driving voltage Vcc through a resistor R23. A resistor R27 is connected between the base of transistor Q27 and a ground.

The present invention includes a constant current source 7 which is a current mirror circuit in which emitters and bases of PNP type transistors Q10, Q11, and Q12 are connected to one another and in which a base and a collector of transistor Q12 are connected to each other in order to control a current $I_{27}$ flowing through second transistor Q27 by an input control signal $V_R$ from an outside.

A NPN type transistor Q13 and emitter resistor R12 thereof are connected between a collector of transistor Q12 and a ground. A divider 9 formed by a resistor R13 and a Zener diode DZ1 is connected to a base of transistor Q13.

Accordingly, since a constant voltage determined by Zener diode DZ1 is applied to the base of transistor Q13, a current $I_{c13}$ flowing through transistor Q13 is determined by means of an expression (2) which will be described later. Also, currents $I_{c10}$, $I_{c11}$, and $I_{c13}$ flowing through transistors Q10, Q11, and Q12, respectively, are calculated by expression (2).

$$I_{c10}=I_{c11}=I_{c13}=(V_{DZ1}-V_{BE13})/R12 \qquad (2)$$

A collector of transistor Q10 supplying a constant current $I_{c10}$ is connected to a collector of transistor Q27 of differential amplifier 22, and a coupling point thereof is connected to a collector of NPN type transistor Q9. An emitter resistor R29 is connected between an emitter of transistor Q9 and a ground. A collector of transistor Q11, which supplies the constant current $I_{c11}$, and an input circuit 21 to which a input control signal $V_R$ is applied, are connected to a base of transistor Q9.

Input circuit 21 is composed of Darlington-connected transistors Q14 and Q15, has a high input impedance, and can be operated at around 0 volts because of an input control signal $V_R$ thereof which is applied to a base of PNP type transistor Q15.

Resistor R11 connected to a base of transistor Q15 is a resistor for suppressing a current due to a surge voltage of an input control signal $V_R$. A resistor R10 which is inserted into an emitter and into a base of transistor Q14, serves to compensate a current flowing to a base of transistor Q14 from the constant current $I_{c11}$. The present invention may include other Zener diodes for limiting the input control signal $V_R$, within a predetermined voltage between a base of transistor Q14 and a ground.

A differential base voltage $\Delta V$ in the present invention constructed as above is calculated by means of an equation (3) which will be described later.

$$\Delta V = V_{BE26}-V_{BE27}=V_T \ln I_{26}/I_s - V_T \ln I_{27}/I_s$$
$$= V_T \ln I_{26}/I_{27} \qquad (3)$$

As described in equation (3), a current $I_{27}$ is the sum $(I_{28}+I_{29})$ of a current $I_{28}$ flowing through a resistor R28 and a current $I_{29}$. A current $I_{29}$ is a value resulting from subtracting $I_{c9}$ flowing through transistor Q9 from $I_{c10}$ provided from a collector of transistor Q10. That is, $$\Delta V=V_T \ln I_{26}/I_{27}=V_T \ln I_{26}/(I_{28}+I_{29})$$
$$=V_T \ln I_{26}/(I_{28}+I_{c10}-I_{c9}) \qquad (4)$$

Also, a current $I_{c9}$ can be expressed as an equation (5) which will be derived from equation (4).

$$I_{c9}=(V_R+V_{BE})/R29 \qquad (5)$$

Therefore, the differential base voltage $\Delta V$ is controlled by the input control signal $V_R$ from equations (4) and (5).

In the DC controlled differential base voltage generating circuit according to the present invention, since a driving voltage Vcc is 12 volts, a base voltage $V_{B24}$ of transistor Q24 is set at Vcc/2, a base voltage $V_{B26}$ of transistor Q26 is determined as 5.3 volts and a base voltage $V_{B27}$ of transistor Q27 varies with respect to a voltage of the input control signal $V_R$ ranges from 0 volt to 4 volts, in accordance with a graph shown in FIG. 4.

In this case, a center point CP is 2 volts, a range of the input control signal $V_R$ capable of controlling a gain is from 0.4 to 3.5 volts when the differential base voltage $\Delta V$ is less than $\pm100mV$ ($\Delta V=V_{BE26}-V_{BE27}=\pm100mV$).

In the conventional DC controlled differential base voltage generating circuit, a driving voltage Vcc is 12V, a base voltage $V_{B4}$ of transistor Q4 is set at Vcc/2, a base voltage $V_{B6}$ of transistor Q6 is determined as 5.3 volts and a base voltage $V_{B7}$ of transistor Q7 varies with respect to a voltage of the input control signal $V_R$ ranges from 0 volt to 12 volts, in accordance with a graph shown in FIG. 3.

In this case, a center point CP is 6.08 volts, and a range of the input control signal $V_R$ capable of controlling a gain is from 1.89 to 10.46 volts when the differential base voltage $\Delta V$ is less than $\pm100mV$ ($\Delta V=V_{BE6}=V_{BE7}=\pm100mV$).

Therefore, since a control range of the input control signal $V_R$ of the conventional DC controlled differential base voltage generating circuit is wider than that of the present invention, a power consumption of the conventional DC controlled differential base voltage generating circuit is high. Because the present invention includes a PNP Darlington-connected circuit in a control input side capable of embodying a high input impedance in the case of an input impedance, it can easily interface with a computer controlled alignment system. Also, circuits of the present invention can operate even though a voltage of the input control signal is around 0 volts.

As described above, the present invention can be used for a DC contrast control by adjusting a gain of an RGB video amplifier for an RGB 3 channel in common.

In the present invention, since a differential base voltage is controlled by an input control signal applied thereto through bases of PNP Darlington-connected transistors, the present invention has a high input impedance and can operate when a voltage of the input contol signal is about 0 volts. Therefore, the present invention can easily interface with a computer controlled alignment system.

The invention has been described in detail in connection with the preferred embodiment. This embodiment, however, is merely for example only and the invention is not restricted thereto. It will be easily understood by those skilled in the art that other variations and modifications can easily be made within the scope of this invention as defined by the appended claims.

What is claimed is:

1. A circuit for generating a direct current control differential base voltage, said circuit comprising:

an input circuit, which includes a pair of Darlington-connected PNP type transistors, for receiving an input control signal and having a high input impedance;

a differential amplifier including first and second transistors;

a first reference voltage generating means for supplying a predetermined reference voltage to a base terminal of the first transistor;

a constant current means for generating a first constant current and for supplying a portion of the first constant current to the second transistor; and a current control means connected to an output terminal of said input circuit for controlling a flow of the portion of the first constant current into the second transistor in proportion to a voltage of the input control signal, whereby said circuit outputs the direct current control differential base voltage from between the base terminals of the first and second transistors of said differential amplifier.

2. The circuit for generating a direct current control differential base voltage as claimed in claim 1, wherein said input circuit further includes a resistor for limiting a current by suppressing the voltage of the input control signal.

3. The circuit for generating a direct current control differential base voltage as claimed in claim 1, wherein said constant current means generates a second constant current and said input circuit further includes a resistor inserted between an emitter and a base of one of the PNP type transistors, for compensating a base current thereof from the second constant current.

4. The circuit for generating a direct current control differential base voltage as claimed in claim 1, wherein said constant current means includes a constant current source for generating the first constant current; and a second reference voltage generating means for supplying a reference voltage in order to decide a constant current with respect to said constant current source.

5. The circuit for generating a direct current control differential base voltage as claimed in claim 4, wherein said constant current source includes third, fourth, and fifth transistors which form a current mirror; and said second reference voltage generating means includes a potential divider, which is formed by a resistor and a Zener diode, and a sixth transistor having a base terminal to which the reference voltage of said potential divider is applied and a collector terminal connected to a collector of the fifth transistor which is diode-connected.

6. The circuit for generating a direct current control differential base voltage as claimed in claim 1, wherein said current control means includes an NPN type transistor having a collector connected to a first output of said constant current means, and having a base terminal connected to the output terminal of said input circuit and a second output of said constant current means; and a resistor coupled between said NPN type transistor and a ground.

7. The circuit for generating a direct current control differential base voltage said circuit comprising:
   a pair of Darlington-connected PNP type transistors for receiving an input control signal and having a high input impedance;
   a differential amplifier including first and second transistors;
   a first reference voltage generating means for supplying a predetermined reference voltage to a base terminal of said first transistor;
   a constant current source for generating a first constant current and a second constant current, and for supplying a portion of the first constant current to the second transistor and the second constant current to the Darlington-connected PNP type transistors, respectively;
   a second reference voltage generating means for supplying a constant reference voltage to said constant current source; and
   a current control means connected to an output terminal of said Darlington-connected PNP type transistors, for controlling a flowing of the portion of the first constant current into the second transistor in proportion to a voltage of the input control signal, whereby said circuit outputs the direct current control differential base voltage from between the base terminals of the first and second transistors of said differential amplifier.

8. The circuit for generating a direct current control differential base voltage as claimed in claim 7, wherein said Darlington-connected PNP type transistors are coupled to a resistor for limiting a current by suppressing the voltage of the input control signal.

9. The circuit for generating a direct current control differential base voltage as claimed in claim 7, wherein said Darlington-connected PNP type transistors are coupled to a resistor inserted between an emitter and a base of one of the PNP type transistors, for compensating a base current thereof from said second constant current.

10. The circuit for generating a direct current control differential base voltage as claimed in claim 7, wherein said constant current source includes third, fourth, and fifth transistors which form a current mirror; and said second reference voltage generating means includes a potential divider, which is formed by a resistor and a Zener diode, and a sixth transistor having a base terminal to which a driving voltage of said potential divider is applied and a collector terminal for supplying the constant reference voltage to a collector of the fifth transistor which is diode-connected.

11. The circuit for generating a direct current control differential base voltage as claimed in claim 7, wherein said current control means includes NPN type transistor whose collector is connected to a first output of said constant current source, and whose base is connected to the output terminal of said Darlington-connected PNP type transistors and a second output of said constant current source; and a resistor coupled between said NPN type transistor and a ground.

* * * * *